United States Patent
Stiesdal

(10) Patent No.: US 8,410,625 B2
(45) Date of Patent: *Apr. 2, 2013

(54) METHOD FOR WIND TURBINE YAW CONTROL

(75) Inventor: Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/290,232

(22) Filed: Nov. 7, 2011

(65) Prior Publication Data

US 2012/0049520 A1 Mar. 1, 2012

Related U.S. Application Data

(63) Continuation of application No. 12/218,715, filed on Jul. 17, 2008, now Pat. No. 8,093,738.

(30) Foreign Application Priority Data

Jul. 20, 2007 (EP) .................................. 07014330

(51) Int. Cl.
*F03D 9/00* (2006.01)
(52) U.S. Cl. ............................................ 290/44; 290/55
(58) Field of Classification Search .................... 290/43, 290/44, 54, 55; 416/9, 61
See application file for complete search history.

(56) References Cited

U.S. PATENT DOCUMENTS

| | | | | |
|---|---|---|---|---|
| 6,946,751 B2 * | 9/2005 | Yoshida et al. | ................. | 290/44 |
| 7,086,835 B2 * | 8/2006 | Yoshida | ............................ | 416/9 |
| 7,244,100 B2 * | 7/2007 | Yoshida | ............................ | 416/9 |
| 7,939,961 B1 * | 5/2011 | Bonnet | ........................... | 290/55 |
| 8,093,738 B2 * | 1/2012 | Stiesdal | .......................... | 290/44 |
| 2005/0169755 A1 * | 8/2005 | Yoshida | ................... | 416/132 B |
| 2009/0039651 A1 * | 2/2009 | Stiesdal | .......................... | 290/44 |
| 2009/0060740 A1 * | 3/2009 | Stiesdal et al. | .................. | 416/41 |
| 2010/0054939 A1 * | 3/2010 | Hoffmann | ....................... | 416/10 |

* cited by examiner

*Primary Examiner* — Nicholas Ponomarenko

(57) ABSTRACT

A method for yaw control for a wind turbine comprising a rotor with a rotor blade, the rotor defining a rotor axis and a rotor plane to which the rotor axis is perpendicular, in which the rotor axis is turned to minimize the yaw angle between the ambient wind direction and the rotor axis is provided, wherein the turning of the rotor axis is performed based on the measurement of a wind speed in the rotor plane at the rotor blade. Furthermore, a wind turbine which comprises a rotor which includes a rotor axis and a rotor plane perpendicular to the rotor axis and an anemometer for measuring the ambient wind speed is provided. The wind turbine further comprises an anemometer which is located such at a rotor blade at a particular distance from the rotor axis as to allow for measuring a wind speed in the rotor plane.

12 Claims, 2 Drawing Sheets

METHOD FOR WIND TURBINE YAW CONTROL

CROSS REFERENCE TO RELATED APPLICATIONS

This application is a continuation of U.S. application Ser. No. 12/218,715 filed Jul. 17, 2008 now U.S. Pat. No. 8,093,738, which claims priority of European Patent Office application No. 07014330.0 EP filed Jul. 20, 2007. All of the documents are incorporated by reference herein in their entirety.

FIELD OF INVENTION

The present invention relates to a method for yaw control of a wind turbine.

BACKGROUND OF INVENTION

Many wind turbines comprise a rotor with its axis in a horizontal position. Wind turbines with horizontal axis require yawing. The yaw angle error is the angle between the rotor axis and the wind direction. To achieve maximum capacity of the wind turbine the rotor axis should be parallel to the wind direction. This means that the yaw angle error has a value of 0°. In this consideration, a vertical tilt angle many rotor axes have in order to prevent the blades from touching the tower at high wind speeds and which, strictly speaking, means that the rotor axis is actually slightly off the parallel orientation, is neglected.

During the yawing process the turbine nacelle is turned around a vertical axis until the rotor axis is, except for a possible vertical tilt angle, parallel to the wind direction. Usually the yaw axis is concentric with the wind turbine tower axis. Yawing is normally carried out by electrical or hydraulic means. The yaw drive unit control is based on a measurement of the wind direction by one or more wind direction sensors placed on the turbine nacelle.

When the wind direction sensors are located on the turbine nacelle of the wind turbine with a rotor placed upwind of the tower, the wind direction sensors are not exposed to free, undisturbed wind. Instead, the wind has passed through the rotor and may be distorted by this rotor passage and by speed-up phenomena around the nacelle itself. Such a distortion is usually a function of wind speed, turbulence, wind direction and vertical wind inclination. Consequently, the yaw alignment of the rotor axis with the wind direction is associated with some uncertainty when carrying out yaw control based on nacelle-mounted wind direction sensors.

At low and medium wind speeds the power output is sensitive to proper yaw alignment. It is generally believed that on wind turbines the relationship between yaw alignment and power output is a cosine-square function, rather than a simple cosine function, as would be expected. The reason for this high sensitivity is related to the downwind wake behaviour of the wind turbine.

If the cosine-square relationship is valid, a 5° yaw angle error corresponds to a power output of $\cos^2(5°)=0.99$, which means a 1% loss of power. While a loss of this magnitude may sound marginal, it easily runs into more than 100,000 kWh annually for a large wind turbine. Furthermore, yaw angle errors create higher dynamic loading on the wind turbine structure which is an unwanted phenomenon.

SUMMARY OF INVENTION

Up to now the problem of yaw alignment has been solved by proper calibration of nacelle-mounted wind direction sensors. During type testing the yaw alignment of the wind turbine is measured by a comparison of the yaw direction with the wind direction measured at a free-standing meteorological mast. Any offset can be adjusted by permanent adjustment of the wind direction sensor mounting brackets. Any dependence on wind speed can be adjusted by implementing suitable correction algorithms in the turbine controller.

However, some difficulties occur in this traditional approach. At first the traditional method is sensitive to tolerances in the baseline measurements, for example the calibration of the wind direction measurement of the instruments mounted at the free-standing meteorological mast, the calibration of the yaw direction measured at a test turbine and the accuracy of the test turbine brackets for the nacelle-mounted wind direction sensors. Further, the accuracy of yawing will always be a function of the accuracy of the mounting of the sensors on the individual turbines in the field. Moreover, the flow distortion in the field may be different from the flow distortion in the test turbine, for instance, as a result of differences in nacelle equipment that may affect speed-up characteristics over the nacelle and differences in ambient flow conditions. Typically, differences in nacelle equipment may occur on aerial warning lights. Differences in ambient flow conditions may be, for instance, turbulence or flow inclination, for example due to landscape features at the turbine's location.

In an attempt to address these issues the mounting of instruments on front of the nacelle has been tried. Various methods have been tried but the simplest method is to move the wind direction sensors on a bracket that is located in the rotor axis in front of the rotor hub. This arrangement requires a hollow turbine shaft. The instrument bracket is fitted to a bearing at the rotor hub and a torque tube through the hollow rotor shaft ensures that the instruments do not rotate with the rotor hub.

This solution solves the issue of flow distortion but it retains the difficulties of sensitivity to tolerances in the baseline measurements and the dependence on the accuracy of sensor mounting. It is very difficult to achieve an uncertainty in the order of ±5° when all the elements of the uncertainty are taken into account. Furthermore, the solution of the flow distortion problem is paid in the location of the wind direction sensors in a position that is very difficult to access. This causes difficulties regarding maintenance and repair. A further result is a rather complex arrangement of bearings and torque tubes.

A more advanced method uses a set of instruments, typically in the form of a two- or three-axis ultrasonic anemometer, which is located in the rotor axis in front of the rotor hub. Since this type of instrument may be allowed to rotate with the rotor hub, no hollow turbine shaft or torque tube are required.

This solution solves the issue of flow distortion and it also has the potential of partially solving the issue of sensitivity to tolerances in the baseline measurements. However, some flow distortion may exist, due to the dynamical pressure in front of the hub, even in front of the rotor at the rotor axis and the solution of the flow distortion issue is again paid with the location of the wind direction sensors in a position that is very difficult to access, resulting in difficulties in relation to maintenance and repair.

In GB 2 067 247 A a device for determining the wind energy in order to control wind generators, especially in order to align the position of the plane of rotation of the rotor in relation to the air flow, is disclosed. The wind energy at the rotor plane is controlled with the aid of a pressure difference measured by probes, wherein the pressure probes are arranged at the surface of the rotor blades.

In U.S. 2004/0201220 A1 an aerodynamic control system for a wind turbine including a drive shaft and blade is disclosed. The control system includes an air control system coupled to a duct that extends from a first end toward a second end of the blade. A slot extends along a portion of a surface of the blade and is in communication with the duct. An instrument measures operating data of the wind turbine. A controller collects the operating data and compares them to predetermined operating norms. The controller actuates the air control system to urge pressurised air into the duct and out of the slot at a specific air flow rate based upon the comparison between the operating data and predetermined operating norms. Control of the flow rate aids in capture of power from the wind flowing through a swept area of the wind turbine.

In DE 201 14 351 U1 a device for determining a wind vector is disclosed. The device can especially be used for a wind turbine.

In WO 2005/093435 A1 an apparatus and a method used to determine the speed and direction of the wind experienced by a wind turbine are provided. Said apparatus comprises at least one sensor fixed to the rotor of said wind turbine, an angular sensor to measure the angular position of the rotor of said wind turbine, and a circuit which converts the relationship between the output of said at least one sensor and the output of the angular sensor into the speed and direction of the wind experienced by the wind turbine. The sensing apparatus can measure the wind speed and direction in three dimensions.

Given this state of the art, it is an objective of the present invention to provide an advantageous method for yaw control of a wind turbine. It is a further objective of the present invention to provide an advantageous wind turbine.

These objectives are solved by a method for yaw control and a wind turbine as claimed in the independent claims. The depending claims define further developments of the invention.

The inventive method for yaw control relates to a wind turbine which comprises a rotor with at least one rotor blade. The rotor defines a rotor axis and a rotor plane to which the rotor axis is perpendicular. In order to minimise the yaw angle error between the wind direction and the rotor axis the rotor axis is turned. The turning of the rotor axis is performed based on the measurement of a wind speed in the rotor plane at at least one rotor blade. The turning of the rotor axis is further performed based on a measured periodic variation of the wind speed in the rotor plane during a rotation period of the rotor. The measurement of a wind speed in the rotor plane at a rotor blade, instead of a measurement at the rotor axis or at the nacelle, avoids the influence of flow distortion that may occur in front of the rotor at the rotor axis or at the nacelle. In addition, the location of the turbine blade is easier to access than a location at the rotor hub.

The inventive method, which is based on a measurement of the local wind speed on one or more wind turbine blades, allows it to measure a periodic variation of the wind speed if the turbine is not aligned properly with the wind direction. This is irrespective of the type of wind speed sensor used. The measured periodic variation is a function of the yaw angle error and consequently it may be used for yaw control purposes. The use of a wind speed measurement at the rotor blade for yaw control purposes avoids the difficulties which may occur if wind direction sensors are located, for instance, at the rotor axis.

Using the inventive method, the accuracy of the yaw angle error detection increases with increasing wind speed. This is particularly important in relation to the reduction of dynamic load on the wind turbine structure.

Furthermore, the inventive method and the inventive wind turbine, which will be described later, are insensitive to tolerances in any baseline measurements simply because no baseline measurements are required. Moreover, they are insensitive to the accuracy of the mounting of the sensors on the individual turbines in the field since inaccuracy will only result in a small change in gain in the regulation loop and not in any deviation of the observation of true alignment. The inventive method is insensitive to flow distortion and measures the yaw angle error where it matters, that is, in the rotor plane. The advantage of the inventive method for yaw control is that it maximises the energy output and minimises the dynamic loading on the wind turbine structure.

Preferably, the measured wind speed may be the speed of the relative wind in the rotation direction of at least one rotor blade. The turning of the rotor axis is performed based on a periodic variation of the wind speed in the rotor plane during a rotation period of the rotor. This provides a very simple and precise method for yaw control. A periodic variation of the wind speed in the rotor plane during a rotation period of the rotor is caused by a horizontal component of the ambient wind speed in the rotor plane. The ambient wind speed has a component in the rotor plane if the ambient wind direction and the rotor axis are not parallel to each other, i.e. if a yaw angle error occurs. If the ambient wind direction and the rotor axis are parallel to each other then the periodic variation of the wind speed in the rotor plane during a rotation period of the rotor vanishes. This means that the rotor axis may be turned until the periodic variation is minimal or vanishes. The rotor may then be held in this position until the periodic variation increases again. Upon an increase of the variation, the rotor is again turned until the variation becomes minimal or vanishes.

The direction in which the rotor is to be turned in order to minimise the periodic variation can be determined from the phase of the variation with respect to the rotor's azimuth.

Moreover, the turning of the rotor axis may also be performed based on a measurement of the ambient wind speed and a measurement of the speed of the relative wind in the rotor plane. Also measuring the ambient wind speed allows for the exact determination of the yaw angle error $\alpha$. Concerning the present invention, a selective measurement of the speed of the relative wind in the rotor plane in a horizontal direction, i.e. a measurement of the component of the wind speed along a horizontal direction which is perpendicular to the rotor axis and perpendicular to the vertical axis of the wind turbine tower would, in principle, be enough to determine the yaw angle error. This can be achieved by a suitable triggering of the measurement in relation to the rotor's azimuth. The yaw angle error $\alpha$ can then easily be determined by means of the measured ambient wind speed w and the speed of the relative wind in the rotor plane in a horizontal direction. The ambient wind w speed can be measured by means of an anemometer which is located at the rotor axis, at the turbine nacelle, at the wind turbine rotor blade or at a separate tower which is located such as to be influenced as little as possible by the wake of the turbine(s). For the measurement of the ambient wind speed w a single-, a two- or a three-axis anemometer may be used.

The speed of the relative wind in the rotor plane can also be measured by means of a single-, a two- or a three-axis anemometer. The ambient wind speed w and the relative wind speed in the rotor plane may especially be measured by means of the same two- or three-axis anemometer. Generally the anemometer may be a pitot tube, a cup anemometer or an ultrasonic anemometer. The used anemometer or anemometers may be located on a wind turbine rotor blade in a particular angle $\beta$ to the centreline of the wind turbine rotor blade. The mounting of the anemometer on a wind turbine rotor blade has the advantage that the anemometer is easy to access, especially for maintenance and repair.

Moreover, the distance r of the used anemometer from the rotor axis, the angle β of the anemometer to the centreline of the rotor blade, the azimuth angle Θ of the anemometer, the ambient wind speed w, the speed of the relative wind in the rotor plane u and the angular velocity ω of the rotor can be considered in performing the turning of the rotor. In this case a yaw angle error α would induce a periodic signal which is generally given by the equation $u = r\omega \sin \beta \pm w \sin \alpha \sin(\Theta+\beta)$. The first term of the equation is a constant in case of a fixed angular velocity ω of the rotor. If there is a yaw angle error α between the rotor axis and the ambient wind direction, then the second term of the equation periodically varies depending on the azimuth angle Θ and hence causes a periodic variation of the speed of the relative wind measured in the rotor plane u. If the yaw angle error tends to zero, then the second term of the equation also tends to zero and the periodic variation vanishes.

Consequently, it is possible to turn the rotor axis until the periodic variation is minimal without an explicit determination of the yaw angle. Alternatively, the yaw angle error can explicitly be calculated and be used for turning the rotor axis about a calculated angle. If the yaw angle is to be explicitly calculated, the speed of the relative wind in the rotor plane u and/or the ambient wind speed w and/or the azimuth angle Θ of the anemometer, and/or the angular velocity ω of the rotor can advantageously be measured continuously or in time steps. This allows it to average the calculated data for the yaw angle error α and thus to increase the accuracy.

Preferably the angle β can be set at 90°. This means that the speed of the relative wind in the rotor plane in the rotation direction of the rotor blade $u_t$, which is tangential to the rotation circle, can be measured. The yaw angle error α may be determined by means of the distance r of the anemometer and the simultaneously measured angular velocity ω of the rotor, the azimuth angle Θ of the anemometer, the ambient wind speed w and the relative wind speed $u_t$ in the rotor plane. In this case the equation $u = r\omega \sin \beta \pm w \sin \alpha \sin(\Theta+\beta)$ can be simplified into the equation $u_t = r\omega \pm w \sin \alpha \cos \Theta$. It is again possible to measure the azimuth angle Θ of the anemometer, the ambient wind speed w, the speed of the relative wind in the rotor plane u, which is, in this case, the relative wind speed in the rotation direction $u_t$, and the angular velocity ω of the rotor continuously or in time steps.

An inventive wind turbine is in particularly suitable to perform the inventive method and comprises a rotor comprising a rotor axis and a rotor plane perpendicular to the rotor axis. The wind turbine further comprises at least one anemometer which is located such at a rotor blade at a particular distance r from the rotor axis as to allow for measuring a wind speed in the rotor plane u. At least one rotor blade is equipped with two or more anemometers which are located at different distances r to the rotor axis. This allows for choosing between different distances r which may influence the measurement range and therefore on the accuracy of the yaw control. The wind turbine may also comprise a further anemometer which is located such as to allow for a measurement of the ambient wind speed.

Generally, it is advantageous if the used anemometer is located at the leading edge of the rotor blade or at least partly at the leading edge of the rotor blade. However, locating it at the upwind side of the blade or such at the downwind side as to project over the leading edge is also possible.

The anemometer may be a single-, a two- or a three-axis anemometer. For example, it can be a pitot tube, a cup anemometer or an ultrasonic anemometer. If the anemometer is of a single-axis type it will only measure the speed of the relative wind. If it is a two- or three-axis anemometer, e.g. a cup anemometer or an ultrasonic anemometer, it will also measure the ambient wind.

It is also possible that each wind turbine rotor blade is equipped with at least one anemometer for measuring the component of the wind speed in the rotor plane u. This would equalise possible loads which could occur due to an anemometer located at a rotor blade.

BRIEF DESCRIPTION OF THE DRAWINGS

Further features, properties and advantages of the present invention will become clear from the following description of embodiments in conjunction with the accompanying drawings.

DETAILED DESCRIPTION OF INVENTION

Figure 1:
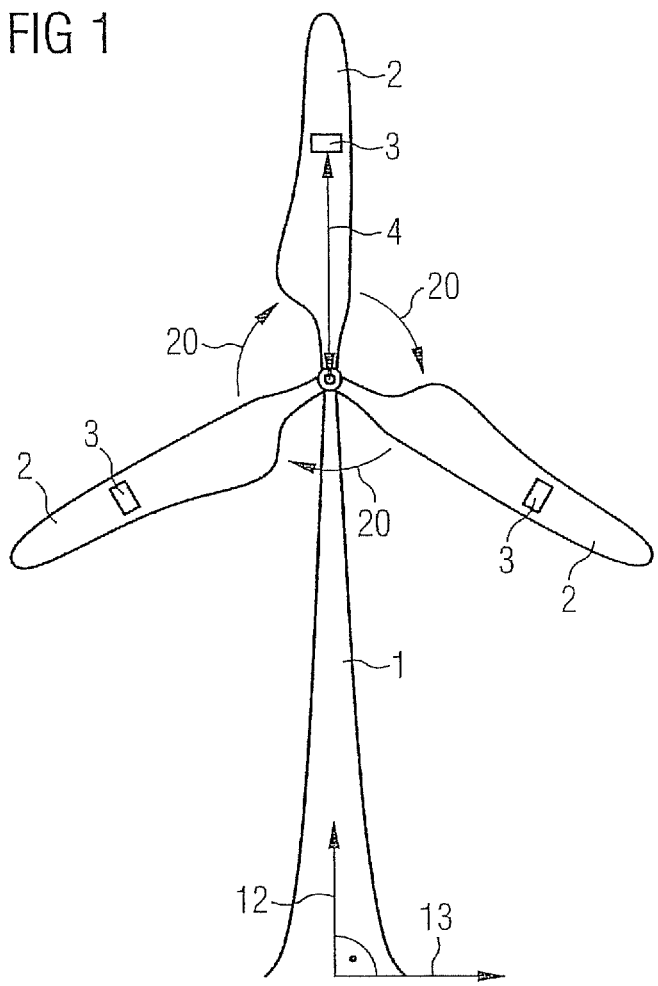
FIG. 1 schematically shows a wind turbine.

The first embodiment of the inventive method and the inventive wind turbine will now be described in more detail with respect to FIGS. 1 to 4. FIG. 1 schematically shows an inventive wind turbine. The wind turbine comprises a wind turbine tower 1 and a rotor with three rotor blades 2. The rotation of the rotor is indicated by arrows 20. Each rotor blade 2 is equipped with an anemometer 3 which is located at a particular distance 4 from the rotor axis. The anemometers 3 are fixed to the rotor blades 2. Alternatively, only one rotor blade 2 or two rotor blades can be equipped with an anemometer 3. Although the anemometers are shown to be located in the middle of the rotor blades 2 it is actually advantageous to locate them near the root ends of the blades 2 in order to influence the blade's aerodynamics as little as possible. In the figure the vertical direction is indicated by an arrow 12 and the horizontal direction is indicated by an arrow 13.

Figure 2:
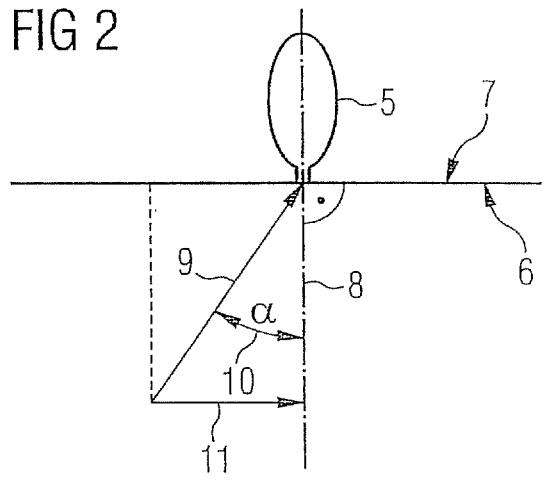
FIG. 2 schematically shows the relation between the yaw angle, the ambient wind speed and the speed of the relative wind in the rotor plane in a horizontal direction.

FIG. 2 schematically shows how the yaw angle error α (indicated by the reference numeral 10) is connected to the ambient wind speed 9 and the speed of the relative wind in the rotor plane. One can see in FIG. 2 a view onto the wind turbine from above. The wind turbine nacelle 5 and the rotor plane are shown. The upwind side of the rotor plane is indicated by reference numeral 6 and the downwind side of the rotor plane is indicated reference numeral 7. The rotor plane, especially the upwind rotor plane 6, is located perpendicular to the rotor axis 8.

If a yaw angle error α occurs, the ambient wind speed 9 is not parallel to the rotor axis 8. This means that the speed of the relative wind in the rotor plane as measured by the anemometer 3 periodically alternates during the rotation of the rotor as the ambient wind's horizontal component 11 in the rotor plane adds to or subtracts from the relative wind generated by the rotor's rotational speed depending on the actual azimuth angle of the respective blade 2.

A high yaw angle error causes high amplitude of the change in the relative wind speed during the rotation of the rotor and a small yaw angle causes small amplitude. Hence, the yaw angle error can be minimised by turning the rotor axis such as to minimise the periodic variation of the measured speed of the relative wind in the rotor plane.

Figure 3:
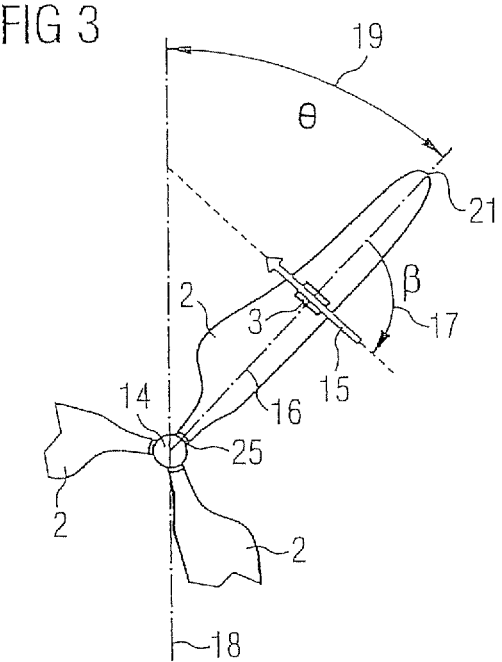
FIG. 3 schematically shows a part of an inventive wind turbine rotor.

FIG. 3 schematically shows a part of the wind turbine rotor. The rotor comprises a rotor hub 14 at the rotor axis and three rotor blades 2 which are connected to the rotor hub 14 at the blade root 25. Each of the three rotor blades 2 has a centreline 16 which is shown for one of the three rotor blades 2. The centreline 16 connects the root 25 with the tip 21 of the rotor blade 2.

In the present embodiment all three rotor blades 2 are equipped with an anemometer 3 which is able to measure the wind speed in at least one direction. This direction is indicated by reference numeral 15. The anemometer 3 is fixed to the rotor blade 2 so that the measured wind direction 15 is perpendicular to the centreline 16 of the rotor blade. This means that the β which is indicated by reference numeral 17 in FIG. 3 is 90° and the speed of the relative wind in the rotation direction in the rotor plane is measured. The angle 17 between the centreline 16 and the measured wind direction 15 may alternatively have a different value which would mean that the wind speed measured by the anemometer 3 in the rotor plane would resemble only a fraction of the speed of the relative wind which is determined by the value of the angle β.

During the rotation of the rotor around the rotor axis the position of the individual rotor blade 2 can be indicated by the azimuth angle Θ, which is indicated by reference numeral 19. The azimuth angle Θ is the angle between the centreline 16 of the rotor blade 2 and the vertical axis 18.

In a first embodiment of the inventive method, the speed of the relative wind experienced by the rotor blades is measured by means of the anemometers 3. Depending on the azimuth of the respective blade 2 the horizontal component of the ambient wind in the rotor plane adds to or subtracts from the relative wind experienced by the blade. In the configuration of the anemometer 3, as shown in FIG. 3, the horizontal component of the ambient wind speed would add to the speed of the relative wind experienced by the plane 2 at an azimuth angle Θ=0, i.e. when the blade shows vertically upwards, if the horizontal component of the ambient wind comes from the right side in FIG. 3. On the other hand, if the azimuth angle of the rotor blade 2 is 180°, i.e. the rotor blade shows vertically downwards, the horizontal component coming from the right side in the picture would subtract from the relative wind experienced by the rotor blade 2. In general, the relative wind experienced by the blade 2 follows a cosine function with the rotor blade's azimuth as argument. The amplitude of the cosine function depends on the yaw angle error α of the wind turbine and follows the relationship $w \sin(\alpha)$. Therefore, the speed of the relative wind measured by the anemometer 3 follows the formula $u = r\omega + w \cos(\Theta)\sin(\alpha)$, where r stand for the radius of the anemometer as measured from the rotor axis, ω stand for the angular velocity of the rotor, w stands for the ambient wind speed, Θ stands for the azimuth angle of the rotor blade as measured from vertical and α stands for the yaw angle error. The azimuth can also be expressed based on the rotor's angular velocity as ωt.

According to this formula each anemometer 3 would measure a varying wind speed which follows a cosine function with the same frequency as the rotation of the rotor. Hence, to realise yaw control the rotor axis can be turned until a variation in the wind speed with the same frequency as the rotational frequency of the rotor is below the measuring limits.

In the described control method, the direction in which the rotor axis is to be turned in order to reduce the yaw angle error, i.e. clockwise or anticlockwise, can also be determined from the varying wind speed signal. The above example has been described with the horizontal component of the ambient wind in the rotor plane coming from the right side in FIG. 3. This means that the measured speed of the relative wind is at a maximum when a rotor blade is in the vertical upright position (the rotation direction of the rotor is as indicated by reference numeral 20 in FIG. 1). If, on the other hand, the horizontal component of the ambient wind in the rotor plane would come from the left hand side in FIG. 3 the maximum in the measured speed of the relative wind would be measured when the rotor blade is showing vertically downwards rather than vertically upwards. In other words, the cosine function would be phase shifted with respect to the rotor's azimuth by 180°. Therefore, by determining the phase of the varying speed of the relative wind one can establish the rotation direction in which the rotor axis has to be rotated in order to reduce the yaw angle error.

It should be noted that although the above-mentioned formula includes the ambient wind speed, a measurement of the ambient wind speed is not strictly necessary. In particular, the actual ambient wind speed can remain unknown if variations in the ambient wind speed have only small amplitude as compared to the average value of the ambient wind speed or a frequency which sufficiently differs from the rotational frequency of the turning rotor so as to be able to distinguish between both frequencies. Only if such a discrimination is not possible and the variation in the ambient wind speed is in the same order of magnitude as the average ambient wind speed it is necessary to know the ambient wind speed.

For a modern wind turbine operating at, for instance, 15 rpm, an anemometer 3 mounted at a distance r of 3 m would measure the following wind speeds in the upwind rotor plane at a 5° yaw angle error:

At 5 m/s ambient wind speed: u=4.7 m/s±0.4 m/s
At 15 m/s ambient wind speed: u=4.7 m/s±1.3 m/s
At 25 m/s ambient wind speed: u=4.7 m/s±2.2 m/s.

Even at a low wind speed the signal variation resulting from yaw angle error of the same magnitude as the total uncertainty of normal instrument mounting will give a signal variation in the order of ±10% as a function of the blade position. Since wind speed instruments can easily be manufactured to a total uncertainty of less than ±1% of the full scale reading, it will be possible to yaw with an accuracy that is in order of magnitude more precise than known from the systems normally applied to wind turbines.

In a second embodiment of the inventive method of yaw control the yaw angle error is explicitly determined by the use of a measurement of the ambient wind speed and a measurement of a wind speed in the rotor plane. An anemometer for measuring the ambient wind speed w, which is indicated by the reference numeral 9, may be located upwind at the rotor axis, at the turbine nacelle 5, at one of the wind turbine rotor blades 2 or at a separate tower in the field. Preferably the ambient wind speed w is measured by at least one of the anemometers 3 which are fixed to the rotor blades 2. In this case the anemometer 3 may be a two- or a three-axis anemometer. The measurement of the ambient wind speed w by at least one anemometer 3 which is located at one of the rotor blades 2 has the advantage that the ambient wind speed w can be measured in nearly undisturbed conditions. Especially turbulence caused by the wind turbine nacelle or turbulence which may occur near the rotor axis are avoided. Generally the anemometer 3 may be a pitot tube, a cup anemometer or an ultrasonic anemometer.

Further, at least the speed of the relative wind in the rotor plane in a horizontal direction $u_h$ is measured by the anemometer 3. This can be realised by, for instance, only measuring the wind speed in the rotor plane if the azimuth angle Θ of the respective blade 2, which is indicated by reference numeral 19, is 0° and/or 180°. In this case the yaw angle error α, which is indicated by reference numeral 10, can easily be determined by use of the equation $u_h = r\omega \pm w \sin \alpha$. The distance r, which is indicated by reference numeral 4, of the anemometer 3 measured from the rotor axis along the centreline 16 is fixed and can be measured when the anemometer 3 is mounted on the rotor blade 2.

Alternatively the azimuth angle Θ (reference numeral 19) of the anemometer 3, the ambient wind speed w (reference numeral 9), the relative wind speed 15 in the rotor plane and the angular velocity ω of the rotor can be measured continuously or in time steps. In this case the yaw angle error α (reference numeral 10) may be determined in dependence on the azimuth by the equation $u_t = r\omega \pm w \sin \alpha \cos \Theta$.

An anemometer 3 located near the rotor axis, which means a small distance r (reference numeral 4), has the advantage that the anemometer 3 is easy to reach from the wind turbine nacelle 5 or the rotor hub 14. At the same time a small distance r has the disadvantage that turbulence near the rotor hub may affect the measurement. A larger distance r (reference numeral 4) causes less easy access to the anemometer 3, but has the benefit that the yaw angle error measurement represents the rotor average to a larger extent. Hence, the anemometer 3 is preferably located at a distance somewhere in the middle between the rotor hub 14 and the tip 21 of the rotor blade.

Figure 4:
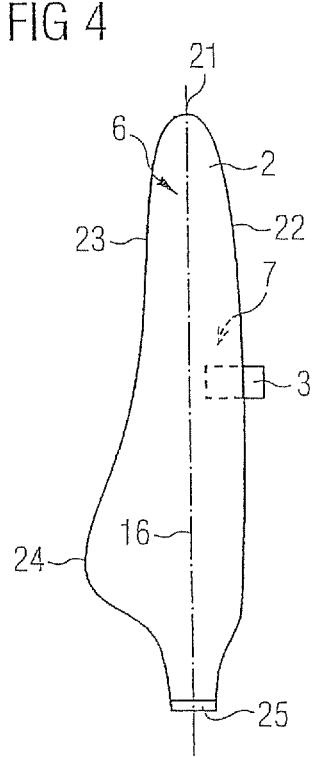
FIG. 4 schematically shows an alternative positioning of an anemometer on a rotor blade.

FIG. 4 schematically shows an alternative positioning of the anemometer 3 on the rotor blade 2. The rotor blade 2 comprises a blade root 25, where the blade is mounted to the rotor hub 14, a tip 21, a shoulder 24, a leading edge 22 and a trailing edge 23. The centreline 16 of the rotor blade connects the blade root 25 with the tip 21. The trailing edge 23 connects the blade root 25 along the shoulder 24 with the tip 21. The leading edge 22 connects the blade root 25 with the tip 21 and is situated opposite to the trailing edge 23. FIG. 4 shows a view onto the upwind side 6 of the rotor blade 2. The anemometer 3 is mounted to the rotor blade 2 at the downwind side 7 and is situated near the leading edge 22 so that it is possible to measure the relative wind speed at the leading edge 22 or in front of the leading edge 22. A further possibility would be locating the anemometer directly at the leading edge of the blade.

It is also possible to use anemometers mounted on more than one rotor blade. This has the additional benefit of redundancy and potentially faster reaction. The use of two- or three-axis anemometers causes a lower sensitivity to yaw angle error, since the ambient wind speed is also measured, but has the advantage that the ambient wind speed is recorded with the same anemometer.

In the embodiments described hitherto the angle β (reference numeral 17) of the anemometer 3 to the centreline 16 has had a value of 90°. This means that the speed of the relative wind experienced by the rotor blade in the rotor plane is measured. However, the angle β (reference numeral 17) of the anemometer 3 to the centreline 16 of the rotor blade can, in general, have any value between 0° and 360°. In this case the yaw angle error α (reference numeral 10) can be determined by the use of the generalised equation $u = r\omega \sin \beta \pm w \sin \alpha \sin(\Theta + \beta)$.

In a third embodiment the inventive method of yaw control and the inventive wind turbine will be described with reference to FIGS. 1, 2 and 5 for the case that the angle β (reference numeral 17) between the anemometer 3 and the centreline 16 of the rotor blade 2 has a value of 0°. Elements corresponding to elements of the second embodiment will be designated with the same reference numerals and will not be described again to avoid repetition.

Figure 5:
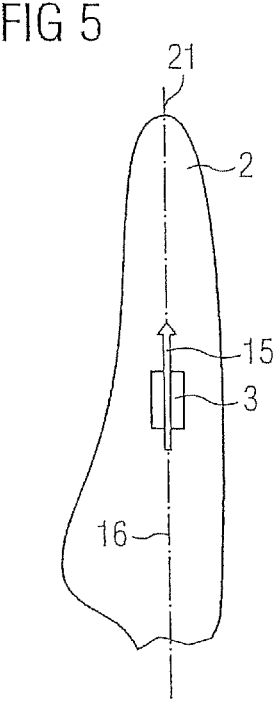
FIG. 5 schematically shows a part of an alternatively mounted anemometer on a wind turbine rotor blade.

FIG. 5 schematically shows a part of an inventive wind turbine rotor blade 2. The rotor blade 2 comprises an anemometer 3 which measures the wind speed along the direction indicated by an arrow 15. In this embodiment the direction of the measured wind speed 15 is parallel to the centreline 16 of the wind turbine rotor blade 2. This means that the angle β between the centreline 16 and the anemometer 3 has a value of 0° and only the radial component $u_r$ of the wind speed in the rotor plane is measured. In this case the above equation can be simplified to $u_r = w\alpha \sin \Theta$. This has the advantage that the angular velocity ω and the distance r of the anemometer 3 to the rotor hub do not need to be known.

Besides the different angle β, all other features and characteristics of the inventive method and the inventive wind turbine are equivalent to the features already described in the first embodiment, especially in the context of the description of FIGS. 1 and 2.

In summary, the inventive method for yaw control and the inventive wind turbine allow a precise yawing based on a measurement of the wind speed in the rotor plane at a rotor blade because the influence of turbulence, which typically occurs near the rotor axis or at the downwind side of the rotor plane, is avoided.

The invention claimed is:

1. A method for yaw control for a wind turbine having a rotor and a plurality of rotor blades, comprising:
    measuring an ambient wind speed;
    measuring a periodic variation of wind speed in a rotor plane during a rotation period of the rotor, the rotor defining a rotor axis and the rotor plane to which the rotor axis is perpendicular; and
    turning the rotor axis as to minimise the yaw angle error between ambient wind direction and the rotor axis, the turning based on the measured speed.

2. The method as claimed in claim 1,
    wherein the measured wind speed is the speed of the relative wind in the rotation direction of at least one rotor blade.

3. The method as claimed in claim 1,
    wherein the direction in which the rotor axis is to be turned is determined from the phase of the periodic variation relative to the azimuth of the rotor.

4. The method as claimed in claim 1,
    wherein the turning of the rotor axis is performed based on a measurement of the ambient wind speed and the speed of the relative wind in the rotor plane, and
    wherein the ambient wind speed is measured at the rotor axis, at a turbine nacelle, at a wind turbine rotor blade or at a separate tower.

5. The method as claimed in claim 1,
    wherein the turning of the rotor axis is performed based on a measurement of the ambient wind speed and the speed of the relative wind in the rotor plane, and
    wherein an anemometer is used to measure the speed of the relative wind in the rotor plane and the distance of the used anemometer from the rotor axis, and
    wherein the angle of the anemometer to the centreline of the rotor blade, the azimuth angle of the anemometer, the ambient wind speed, the speed of the relative wind in the rotor plane and the angular velocity of the rotor are considered in performing the turning of the rotor.

6. The method as claimed in claim 1, wherein at least one measurement from the group selected from speed of the relative wind in the rotor plane, ambient wind speed, the azimuth angle of the anemometer, and angular velocity of the rotor is continuously measured.

7. The method as claimed in claim 1, wherein at least one measurement from the group selected from speed of the relative wind in the rotor plane, ambient wind speed, the azimuth angle of the anemometer, and angular velocity of the rotor is periodically measured at time intervals.

8. A wind turbine, comprising:
   a rotor having a rotor axis and a rotor plane perpendicular to the rotor axis;
   a blade connected to the rotor;
   a plurality of anemometers located at the rotor blade at different radii, the anemometers configured to measure a wind speed in the rotor plane; and
   a controller configured to control turning a rotor axis, based on the measured speed, as to minimise a yaw angle error between an ambient wind direction and the rotor axis.

9. The wind turbine as claimed in claim 8, wherein at least one of the plurality of anemometers is a single-, a two- or a three-axis anemometer.

10. The wind turbine as claimed in claim 8, wherein at least one of the plurality of anemometers is a pitot tube, a cup anemometer or an ultrasonic anemometer.

11. The wind turbine as claimed in claim 8, further comprising a plurality of rotor blades; wherein each rotor blade is equipped with at least one anemometer for measuring the wind speed in the rotor plane.

12. The wind turbine as claimed in claim 8, further comprising an anemometer located such as to allow for a measurement of the ambient wind speed.

* * * * *